April 29, 1924. Re. 15,826
W. W. ODELL
PROCESS OF MAKING COMBUSTIBLE GAS
Original Filed Nov. 7, 1918
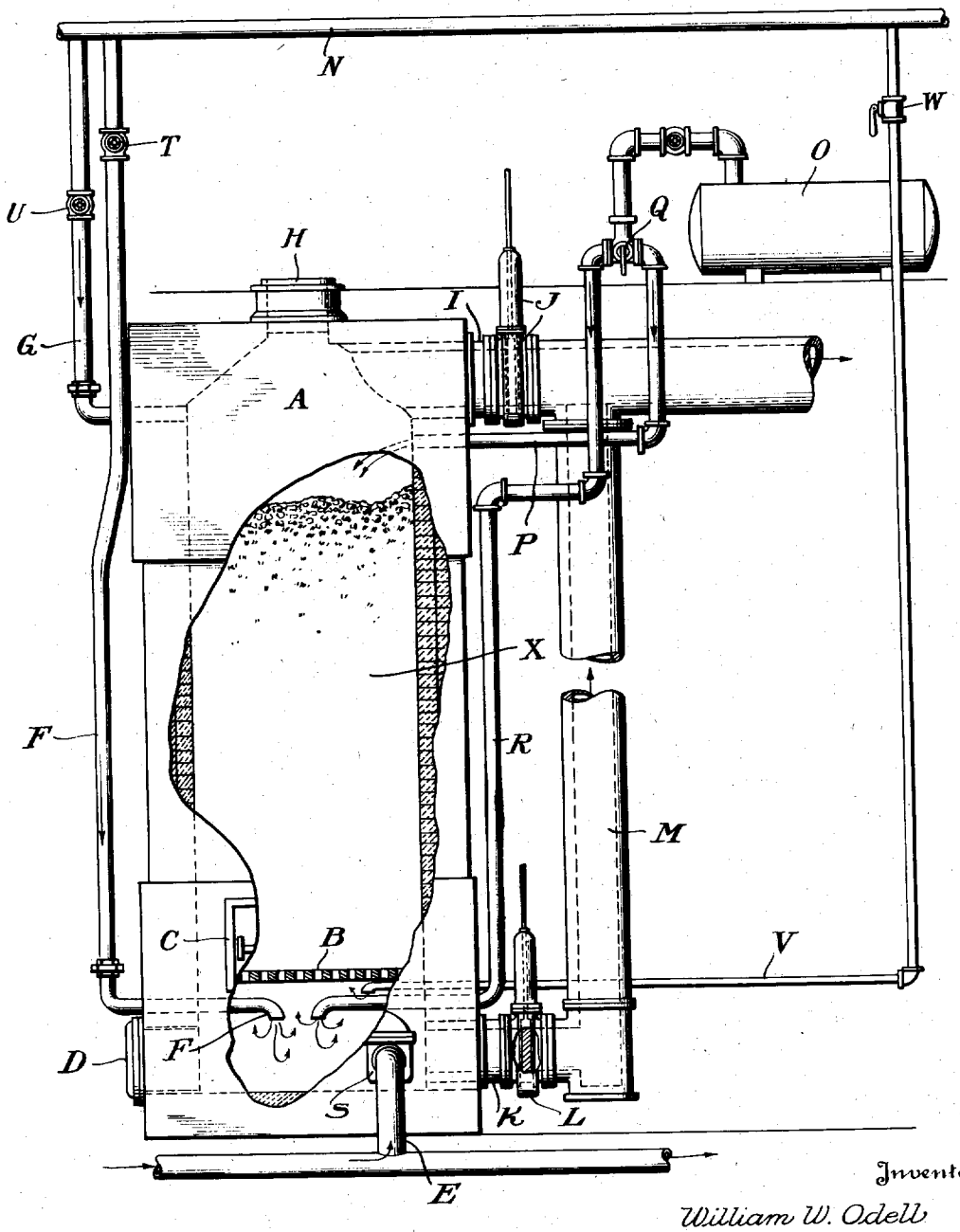
Inventor
William W. Odell
By Munson H. Lane.
Attorney Reissued Apr. 29, 1924. Re. 15,826

UNITED STATES PATENT OFFICE.

WILLIAM WALLACE ODELL, OF PITTSBURGH, PENNSYLVANIA.

PROCESS OF MAKING COMBUSTIBLE GAS.

Original No. 1,379,038, dated May 24, 1921, Serial No. 261,567, filed November 7, 1918. Application for reissue filed April 7, 1923. Serial No. 630,651.

*To all whom it may concern:*

Be it known that I, WILLIAM WALLACE ODELL, a citizen of the United States, residing at Pittsburgh, in the county of Allegheny and State of Pennsylvania, have invented new and useful Improvements in Processes of Making Combustible Gas.

This invention relates to the manufacture of gas by an intermittent process in which fuel is first heated to a high temperature in a generator by means of an air blast, after which the gas is manufactured, chiefly, by passing steam either up or down through the incandescent fuel, but with improvements in the process consisting in admitting some air with the steam during the steam runs, and under certain specified conditions admitting steam with the air during blasting.

The objects of the invention are, while using any of the hereinafter mentioned fuels:

1. To maintain a more uniform and steady heat in the generator and at the same time a longer gas making period.

2. To maintain control over the temperatures in the carbureter and the superheater.

3. To avoid the waste due to burning the blast gases outside the water gas set by burning them in the carbureter and superheater.

4. To overcome the smoke nuisance by burning all the tarry matter and smoke in either the carbureter or superheater or both.

5. To decrease the fuel used per 1,000 cubic feet of gas made.

6. To increase the volume of gas produced per given time in a given size water gas set.

7. To prevent excessive clinker formation.

8. To maintain a high temperature on a greater per cent of the fuel in the generator.

9. To prevent the caking and arching of the fuel in the generator which is a troublesome feature in the ordinary operation of a water gas set using bituminous fuel.

In obtaining these results I am taking advantage of the peculiar properties of bituminous or bituminiferous fuels, and of the present day standards for city gas, which call for lower heating value and lower candle power than ever before.

By the term bituminous fuel, or bituminiferous fuel, as used in the specification and claims, I refer to such fuels as bituminous coal, sub-bituminous coal and the like, and mixtures containing such fuel in which the percentage of hydrocarbons is high.

The present process, however, is not applicable to peat, which rarely contains less than 85% of moisture, the process being best carried out with fuel having a moisture content not exceeding 20% or 30%.

As far as I am aware this process is further distinguished from other processes or from a combination of a water gas and a producer gas process, 1st, in that it allows a greater percentage of up runs to be made, due to the better control of the temperature in the generator, thereby permitting the saving of the rich hydrocarbons and illuminants from the volatile matter of the fuel in the top portion of the fuel bed. These hydrocarbons are cracked to a great extent when forced down through the fire as with down runs. 2nd. The quantity of steam admitted during the blasting is dependent on the temperatures in the carbureter and superheater, and on the volume of smoke produced during blasting. The gas produced during blasting is entirely consumed within the water gas set and is not passed into a gas holder. 3rd. That definite quantities of auxiliary air and steam are used, and said quantities are under the operator's absolute control and are changed by him whenever indications call for a change. 4th. As far as I am aware, this process differs further from other processes in that one of the uses of the auxiliary steam—the steam admitted during the air blasting—is to increase the volume of high temperature fuel in the generator by preventing the fuel on the grates from becoming excessively hot, thereby permitting the use of a greater amount of air blast. The following chemical reactions will help to explain the last statement:

1. $C+O_2=CO_2$ exothermic reaction.
2. $2C+O_2=2CO$ exothermic reaction.
3. $CO_2+C=2CO$ endothermic reaction.
4. $H_2O+C=CO+H_2$ endothermic reaction.

The first three reactions or equivalent are taking place during the ordinary air blasting of a water gas generator. The zone of complete combustion, as in reaction #1, is invariably at the bottom of the generator, and the excessively high heats are in common practice formed or created in this zone. In my process, on admitting auxiliary steam with the air, reaction #4 takes place, and it takes place at the overheated part of the fire, the zone directly above the grates. This cooling action in the overheated part of the fire permits the heating of a larger zone to the most desirable temperature, which is accomplished by using more blast and by turning off the auxiliary steam before the end of the blast period. It will be seen that as soon as fire is hot enough above the usual hot zone the turning off of the auxiliary steam permits the fuel directly above grates to become hot very quickly, particularly with the increased amount of air blast as mentioned. Thus an increased volume of incandescent fuel is obtained.

In manufacturing water gas by the standard method now in use (by the Lowe process), it has been shown that the following difficulties are encountered when bituminous fuel is used as generator fuel; heats in the generator cannot be maintained high enough to make water gas for more than a brief period without reblasting the generator. On attempting to blast the heats up in the generator by an increased amount of blast, so much combustible gas is produced that it cannot all be burned in the carbureter or superheater without overheating them, and if it is burned at the stack it endangers melting of the stack and causes a waste of fuel. The large percentage of tarry matter and volatile matter from the coal produces a heavy voluminous smoke which is emitted at the stack, causing a nuisance. The volume of gas produced, using bituminous fuel in the generator, is considerably lower than that produced using good coke as fuel and under the same conditions. The fuel used per 1,000 cubic feet of gas made is considerably greater, using bituminous fuel. Clinker is formed to an excessive degree when bituminous fuel is used in the generator and blasted to the necessary temperatures for water gas production.

The figure of the drawing is a view partly in vertical section and partly in elevation and represents a common type of water gas generator equipped to manufacture gas by my process using bituminous or other high volatile fuel. In the figure, A represents a generator, with grates B, and fire cleaning door C, and ash pit door D. The charging door is shown at H. E is the main air blast line to the generator with its air control valve at S. F is the up run steam line with the steam control valve at T. The down run steam line is shown at G, and its steam control valve at U. The off-take to the carbureter for gas made during an up run is at I, and the off-take valve is at J. The down run off-take is at K, and L is the off-take valve. M is the so-called hydrogen pipe which connects the down run off-take with the carbureter. The main steam line is represented by N. The air pressure tank for supplying air to the auxiliary air lines is shown at O. P and R represent, repectively, the auxiliary air lines to the top and bottom of generator, with the common air control valve at Q. The auxiliary steam line to the base of generator is shown at V, with the steam control valve W.

To operate this machine according to my process, air is first blasted up through the fuel bed by opening valve S on air line E. When fuel bed X is heated to a sufficiently high temperature the air is shut off at valve S, and water gas is produced by admitting steam beneath the grates through up run line F, by opening valve T. A little air is admitted simultaneously through auxiliary air line R during this steam run. During this run the valve L is closed and valve J is open. This steam with the small amount of air forces its way up through the fuel bed and by chemical combination produces gas. The ($CO_2$) carbon dioxid formed from the combustion of the auxiliary air is reconverted to (CO) carbon monoxid by the incandescent fuel (according to reaction 3 supra) and hence the only diluent of the finished gas is the nitrogen of said air. Now this is partly compensated for by the increase in amount of volatile products from the bituminous fuel, and further compensated for since the hotter fire now obtaining reduces the amount of carbon dioxid ($CO_2$) which is ever present in water gas; forming in greater percentages as the fuel temperature decreases. Since $CO_2$ is the most undesirable inert in combustible gas, air should not be used with the steam so long as to increase the percentage of this undesirable element. After this steam up run, the steam valve T and the auxiliary air valve Q are closed and the fuel is again blasted from beneath the grates by opening the valve S in the air blast line.

A small amount of steam is simultaneously admitted through the auxiliary steam line V by opening valve W. This produces a richer blast gas (shown in reaction #4 supra) which is completely burned in the carbureter and superheater with the elimination of smoke and tarry matter which would otherwise be in evidence at the stack. This auxiliary steam is not necessarily used during the entire blast period, but just until rich gas is being produced from the air blast as will be the case when heat in the generator is sufficiently high. The gas first produced on blasting is always very lean. Very little auxiliary steam is used, and usually for but a short time unless the carbureter and superheater are not sufficiently hot and more rich gas is needed to heat them, in which case sufficient steam is used to accomplish this end. After this air blast when the fuel is sufficiently hot, a down run is made by first turning off the air at valve S and turning off the steam at valve W, and then admitting the steam through the fire from above the fuel bed by opening valve U on the down run steam line. When this down run is being made, valve L in the off-take must be open, and valve J must be closed. While this down run steam is on, a small quantity of air is admitted through the upper auxiliary air line P by opening valve Q. This air keeps the fuel up to the desired heat for a longer period of steam run, thus increasing the capacity of the water gas set. The cycle is now repeated except that a small amount of auxiliary steam is used on every air blast after the first if conditions require it. It is necessary on blasting with air, or making a steam up run, that valve L be closed and valve J be open. On all down runs valve J is closed and valve L is open.

More concisely stated, the operation is as follows: The fuel bed is first blasted until the upper layers of fuel are thoroughly heated, using an up blast only from beneath the fuel bed. If desired, a small quantity of steam may be admitted with the air blast, thus producing a richer blast gas and eliminating smoke and tarry matter in the carbureter and superheater. After the blast an up-run is made, a small quantity of air being admitted with the steam. After this run the fuel is again blasted from beneath the grates, the blast being followed by another run which may be up or down. Both up and down runs are made during the process, but the number of up runs is preferably in excess of the number of down runs, in order to keep the fuel bed in proper condition for most favorable operation when using bituminous coal and other fuel having a high content of volatile constituents. These volatiles are cracked to a great extent when forced down through the fire as with down runs.

It will be understood that the steam used during the run in water gas processes may be varied from straight up runs to straight down runs and split runs (both up and down). When the minimum amount of steam is used per thousand cubic feet of gas and a high air blast pressure is used the generator fuel becomes so hot during a blast that if a straight down run is made it will burn out the grates. Further, all sets are so designed that it is necessary to start the runs with up steam, otherwise there would be an explosion as a result of the hot gas meeting the air under the grates. In smaller plants it is possible to make straight up and down runs. It is always necessary, however, to end every run with up steam, otherwise there would be an explosion upon starting the blast; therefore, the so-called straight down runs are approximately as follows:

Up steam, 15 seconds.
Down steam, 2 minutes.
Up steam, 15 to 45 seconds.

Split runs are approximately as follows:

Up steam, 1 minute.
Down steam, 1½ minutes.
Up steam, 1 minute.

In my process I propose to use split runs when it is found desirable in the large sets, and straight runs when possible in the smaller sets. The actual length of run depends upon the quantity of steam available and upon the amount of blasting.

In large plants using a high air blast pressure it is almost impossible to make a whole run with down steam for the reason that the grates will not stand it and will burn out. It is, therefore, necessary to make split runs, that is, a part of the run with up steam and a part of it with down steam. The cycles in a large plant will be substantially as follows:

1. An up blast with air.
2. A split run up and down steam, using air with the steam.
3. An up blast with air.
4. Either a straight up run or a split run using air.

Air is nearly always supplied to the main air blast line by a fan or blower, and the air pressure procurable from such fans is usually not great enough to use this source of air to replace the high pressure auxiliary air which I prefer to use in my process. There would be danger of explosion if low pressure air were used during steam runs. For example, if a little water condensed in the steam line and was blown into the generator as steam was turned on, the high pressure immediately created would force gas back into the low pressure air line and the gas and air mixture might explode and do damage. A meter, governor, and pressure gage, should be used on this high pressure auxiliary air supply line. I also prefer to use an auxiliary steam line separate from the regular up run stream line for similar safety reasons. The auxiliary steam admitted through valve W in the figure can be regulated by a governor to give any desired quantity or pressure, but coming through a very small line there is never a possibility of a great quantity of steam entering at once or an excessive pressure being developed, and hence there is no danger of back firing in the blast line.

The objects of my process are accomplished as follows:

Object 1 is accomplished by admitting a relatively small volume of air with the steam during the runs, causing combustion to take place and thereby preventing the fuel from becoming superficially chilled, and simultaneously lengthening the run period. Further, object 1 is accomplished by the proper use of up and down runs consistent with the new method of blasting (with the occasional use of steam during the blast) and of making the steam run (by the use of air with the steam during the run).

#2 is accomplished by governing the amount of auxiliary steam admitted during the blast. The more steam admitted at this time, the more combustible gas is produced to burn in the carbureter and superheater as shown in reaction #4 supra.

#3 is accomplished on account of the fact that the slightly leaner water gas, which is produced in increased volume, requires more oil per given period of time to carburet it. This heavier duty for the carbureter and superheater requires that more heat be supplied them and thus it is possible to burn more gas in them without the danger of overheating them.

#4 is accomplished along with #3.

#5 is accomplished by not wasting any combustible gas at the stack of superheater, but by turning it as mentioned in #3 above.

#6. The auxiliary air admitted during the gas making period prolongs the gas making period and also produces a greater volume of water gas per given time. This, with the additional volume of gas from the carbureting oil, gives an increased capacity to a given sized water gas set. The additional volume of water gas made is not due chiefly to the added volume of gas from the auxiliary air. The gas made in generator per second during steam run in present practice is decidedly greater the first few seconds that the steam is admitted and then falls off rapidly. Now, the auxiliary air used in my process during the steam run prevents the temperature from dropping too rapidly and thus increases considerably this maximum gas making period, and also the volume per given time.

#7 is accomplished due to the fact that the auxiliary steam used during the blast keeps the clinker zone cooler.

#8 is accomplished by the increase in amount of blast.

#9 is accomplished, due to better fire conditions obtaining in the generator; to the benefits derived from admitting auxiliary air during the down runs, and to the increased per cent of high temperature fuel in the generator.

The results obtained during the run with my process are vitally affected by the method of blasting, as well as by the direction of the blast and the amount of air per unit time. This is evident, since the quality and quantity of the blue gas produced during the run depend on the condition and temperature of the fuel, and on the volume of the fuel that is heated to a gas making temperature. I am able (by the proper use of air with the steam during the run; with the proper proportion of up and down runs, and with the occasional use of some steam during the blast) to obtain absolute control over the condition of the fuel in the generator and am thereby enabled to make the maximum amount of high quality gas per unit of time during the run. By making up blasts only I maintain the zone of complete combustion (the hot zone) near the bottom of the generator fuel bed. The incoming steam on all up runs (and most of the runs are up runs) strikes the hottest part of the fuel first, and, being instantly heated to a high temperature, has a longer time of contact with the fuel at a high temperature than it would where the steam had to travel half way through the fuel bed before reaching the highest temperature. The zone of complete combustion being at the lower part of the fuel bed in my process causes the blue gas leaving the generator to leave at a lower temperature than the highest temperature in the generator. This is particularly true on all up runs when the hot gases pass through the green fuel at the top of the generator, causing distillation of much of the volatile matter from the fuel, which is retained in the blue gas which is thereby enriched. Since less heat is removed from the generator as sensible heat per unit of gas made, it follows that more heat is available for gas making purposes.

That there is definite coaction between the blast and run in my process is further evident on considering the following: I use up blasts only and use many up runs and some down runs, thus preventing too great a concentration of heat in a particular zone. This is a decided advantage over the processes that use a down blast only and follow them with up runs only, since in these processes a zone of intense heat is created near the top of the fuel bed. In such cases the generator top, off-take valve, and off-take pipe, are constantly in danger (danger of overheating and melting), due to the excessive temperature created in this hot upper zone; the blue gas leaves the generator at an excessively high temperature, thus causing an increase in the generator fuel per thousand feet of gas made: the steam never strikes the hottest part of the fuel bed first. The ash formed during the down blasts (being near the top of the generator) is, to a considerable extent, carried over into the checker chambers on subsequent runs. This ash deposit is a source of considerable trouble.

Obviously the relative number of up runs employed in the practice of my method as compared with the number of down runs, may be varied to a considerable extent within the scope of my invention, but it is to be understood that for the most efficient operation the greater number of runs should be up runs, there being, preferably, at least two up runs to every down run. It will furthermore be understood that while the amount of air introduced with the steam during a given run is not definitely fixed yet it is necessarily relatively small as compared to the amount of steam.

In my process I make use of the commonly used carbureting method consisting in blowing or spraying oil into heated checker chambers. I recognize that this is not new and, therefore, do not claim a patent on that process as such. However, I obtain a marked improvement in carbureting results and use the old method in a new way. That is:

1. I make a better grade of blue gas which contains considerable volatile matter of the fuel, thus the oil is cracked in a different atmosphere.

2. In using air during the run some producer gas is generated which further changes the atmosphere the oil is cracked in.

3. Since I make more blue gas (including the volatiles from the fuel, and the producer gas made) more oil is required per run with a given size set than in other processes, so far as I am aware. This, together with the method of blasting, allows for a more perfect control over the temperature in the cracking chambers without the customary waste of blast gases at the stack.

4. The rate of production of blue gas is more uniform in my process, on account of the air admitted during the run and on account of the better temperature conditions obtaining in the generator, hence the oil concentration in the cracking chambers can be maintained more uniform and the cracking more efficiently done.

Throughout the specification the term water gas has been used, but it will be understood that the term as applied to the gas produced in the present process refers to a combustible gas which may be made from bituminous coal and other solid fuel rich in illuminants, and which may also contain a relatively small quantity of carbon dioxide, due to the admission of air during the runs.

The gas produced by this process is a water gas having a relatively low nitrogen content.

I claim:

1. The improvement in the process of manufacturing water gas of low nitrogen content from bituminiferous fuel having a moisture content of less than twenty per cent, by an intermittent process in a single generator which consists in alternating an upblast with up and with down steam runs, a relatively small quantity of air being introduced with the steam during the runs, and the number of up runs being greater than the number of down runs.

2. The improvement in the process of manufacturing water gas of low nitrogen content from bituminiferous fuel having a moisture content of less than twenty per cent, by an intermittent process in a single generator which consists in alternating an upblast with up and with down steam runs, a relatively small quantity of air being introduced with the steam during the down runs, and the number of up runs being greater than the number of down runs.

3. A process for the manufacture of combustible gas by an intermittent method, using bituminous coal or other solid fuel containing volatile combustible matter, consisting in first heating a bed of ignited fuel in a generator by blasting it with air, using an up blast only from beneath the fuel bed, and using simultaneously with this air blast a relatively small amount of steam also introduced from beneath the fuel bed during the fore part of the blast period only, for the prevention of smoke, continuing said blast so as to better heat the upper zones in the fuel bed, shutting off said air as well as the steam used therewith and making up and down runs, a small quantity of air being introduced with the steam during each of said runs, and making at least two up runs to every down run for the purpose set forth.

4. A process for the manufacture of combustible gas by an intermittent method which consists in periodically heating a bed of ignited fuel in a generator by blasting it with air, using an up blast only from beneath the fuel bed, and during a portion of the blast period employing a relatively small quantity of steam introduced from beneath the fuel, continuing said blast until the upper zones of the fuel bed are thoroughly heated, and alternating the blast with up and down runs, the number of up runs being greater than the number of down runs, a relatively small quantity of air being admitted with the steam during the runs.

5. A process for the manufacture of combustible gas by an intermittent method which consists in periodically heating a bed of ignited fuel in a generator by blasting it with air, using an up blast only admitted from beneath the fuel, continuing said blast until the upper zones of the fuel bed are thoroughly heated, alternating the blast with up and down runs, the number of up runs being greater than the number of down runs, and admitting with the steam during the runs a relatively small quantity of air.

6. A process for the manufacture of combustible gas by an intermittent method, using bituminous coal or other solid fuel containing volatile combustible matter, consisting in first heating a bed of ignited fuel in a generator by blasting it with air, using an up blast only, from beneath the fuel bed, and using simultaneously with this air blast a relatively small amount of steam also introduced from beneath the fuel bed during the fore part of the blast period only, for the prevention of smoke, continuing said blast, so as to better heat the upper zones in the fuel bed, shutting off said air as well as the steam used therewith and making up and down runs, a small quantity of air being injected with the steam during each of said runs for the purpose set forth.

7. The improvement in the process of manufacturing water gas of low nitrogen content from bituminiferous fuel having a moisture content of less than twenty per cent, by an intermittent process and in a single generator which consists in alternating an up blast with split runs, a relatively small quantity of air being introduced with the steam during the runs.

8. The improvement in the process of manufacturing water gas of low nitrogen content from bituminous coal, by an intermittent process and in a single generator which consists in alternating an up blast with split runs, a relatively small quantity of air being introduced with the steam during the runs.

9. The improvement in the process of manufacturing water gas of low nitrogen content from bituminiferous fuel having a moisture content of less than twenty per cent, by an intermittent process in a single generator which consists in alternating an upblast with up and with down steam runs, a relatively small quantity of air being introduced with the steam during the up runs, and the number of up runs being greater than the number of down runs.

10. The improvement in the process of manufacturing water gas of low nitrogen content from bituminous coal, by an intermittent process in a single generator which consists in alternating an upblast with up and with down steam runs, a relatively small quantity of air being introduced with the steam during the runs, and the number of up runs being greater than the number of down runs.

11. The improvement in the process of manufacturing water gas of low nitrogen content from bituminous coal, by an intermittent process in a single generator which consists in alternating an up blast with up and with down steam runs, a relatively small quantity of air being introduced with the steam during the down runs, and the number of up runs being greater than the number of down runs.

12. The improvement in the process of manufacturing water gas of low nitrogen content from bituminous coal having a moisture content of less than twenty per cent, by an intermittent process in a single generator which consists in alternating an up blast with up and with down steam runs, a relatively small quantity of air being introduced with the steam during the up runs, and the number of up runs being greater than the number of down runs.

Signed at Washington, District of Columbia, this 7th day of April, 1923.

WILLIAM WALLACE ODELL.